(12) United States Patent
Inoue et al.

(10) Patent No.: US 6,745,214 B2
(45) Date of Patent: Jun. 1, 2004

(54) CALORIE CONTROL APPARATUS WITH VOICE RECOGNITION

(75) Inventors: Koki Inoue, Niiza (JP); Junko Sekiguchi, Soka (JP)

(73) Assignee: Tanita Corporation, Tokyo (JP)

( * ) Notice: Subject to any disclaimer, the term of this patent is extended or adjusted under 35 U.S.C. 154(b) by 493 days.

(21) Appl. No.: 09/770,297

(22) Filed: Jan. 29, 2001

(65) Prior Publication Data

US 2001/0014903 A1 Aug. 16, 2001

(30) Foreign Application Priority Data

Jan. 31, 2000 (JP) ........................................ 2000-021414

(51) Int. Cl.$^7$ ............................................... G06F 3/00
(52) U.S. Cl. ..................................... 708/133; 434/127
(58) Field of Search ........................... 708/133; 434/127

(56) References Cited

U.S. PATENT DOCUMENTS 5,832,446 A * 11/1998 Neuhaus ..................... 434/127
6,508,762 B2 * 1/2003 Karnieli ..................... 434/127

FOREIGN PATENT DOCUMENTS

JP 11-211549 8/1999

* cited by examiner

*Primary Examiner*—Tan V. Mai
(74) *Attorney, Agent, or Firm*—McDermott, Will & Emery

(57) ABSTRACT

Disclosed is a calorie control apparatus for calculating and controlling calorie intake by entering names of food ingested. The apparatus includes a voice input unit, a memory unit, a voice recognition unit, and a control unit. The voice input unit enters a voice signal, and the memory unit stores the calorie value per a unit amount of each of a plurality of foods. The voice recognition unit identifies a food name on the basis of the voice signal entered, and the control unit calculates the calorie intake on the basis of the calorie value per a unit amount of the food stored in the memory unit corresponding to the identified food name.

2 Claims, 10 Drawing Sheets

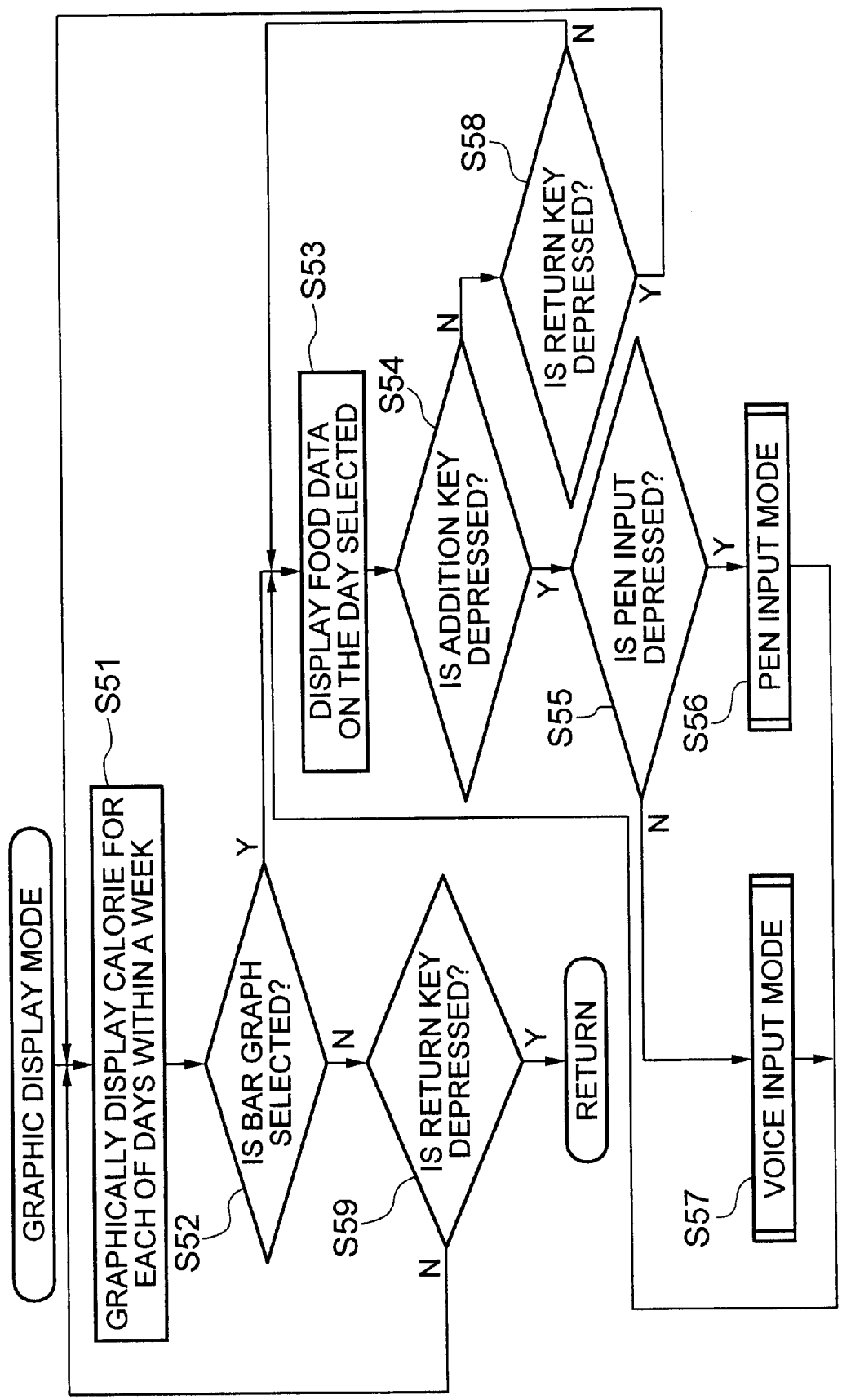

FIG. 7(e)

CUTLET CURRY

FOR ONE PERSON:100%

600g

800Kcal

| 1 | 2 | 3 |
| 4 | 5 | 6 |
| 7 | 8 | 9 |
| 0 | . | C |

DETER-MINATION

FIG. 7(f)

FOOD NAME INPUT

DETER-MINATION

| や | わ | ら | や | ま | は | な | た | さ | か | あ |
| ゆ | を | り | ゆ | み | ひ | に | ち | し | き | い |
| よ | ん | る | よ | む | ふ | ぬ | つ | す | く | う |
| っ | ー | れ | ゛ | め | へ | ね | て | せ | け | え |
| DELETE | ろ | ゜ | も | ほ | の | と | そ | こ | お |

CALORIE CONTROL APPARATUS WITH VOICE RECOGNITION

BACKGROUND OF THE INVENTION

1. Field of the Invention

The present invention generally relates to a calorie control apparatus for calculating and controlling the calorie intake by entering a name of food ingested.

2. Description of the Prior Art

Recently it has been recognized in various fields that eliminating the corpulence of a person is essential for prevention of the adult disease. On the other hand, among the young women, a diet for the purpose of beauty becomes popular and they have interested in calorie intake and calorie consumption. In addition, some of the persons have a body weight substantially lower that the normal due to an unbalanced diet. In order to have the proper diet it is necessary to calculate the calorie intake, and therefore, a portable calorie calculation unit for use in anywhere has already been developed.

For instance, there is a calorie calculation unit developed in which personal information such as age, sex, height, body weight and other information about the living circumstances for a person are stored in advance. Each time the person takes a meal the person enters the names of foods that he ingested and food numbers assigned therefor in advance. Then the calorie calculation unit indicates the total calorie intake for a day or compares it with the necessary calorie value derived from the above-described personal information for indication to the person.

Such calorie calculation unit is configured to read out the calorie data for each of the foods from the memory for calculation. However it is necessary to enter some data that can identify each of the foods ingested, as described above.

Due to the fact that there are great many kinds of food present now a various types of input means have been developed for facilitating input of the food ingestion data to a calorie control apparatus.

One of such input means was to enter a code number assigned to each of the foods for inputting the food ingestion data.

Another input means is disclosed in the applicant's Japanese Patent Application Laid-Open No. 11-211549. As disclosed therein, when an initial character of the name of food ingested is selected from among the Japanese syllabary (Japanese characters), then the full names of foods, beginning with that character, are sequentially displayed, one of which can be selected.

However, the input means for inputting the food names, as used in the prior art calorie control apparatus, as described above, had the following deficiencies:

For example, in case of the input means for entering the food numbers with the keys, it was necessary for the person to always carry some form of the list showing the food numbers with him or to memorize such food numbers in his brain. In addition it was very cumbersome for the person to search for the intended foods from among too much food numbers held in such list.

In case of another input means using a bar code for food, it was necessary for the person to always carry a bar code list and a bar code reader with him. When reading the bar code the bar code reader should be operated many times to scan the bar code until it is recognized. In such case a recognition error may frequently occur.

Furthermore, in the case of the input means as disclosed in Japanese Patent Application Laid-Open No. 11-211549, it was ultimately necessary to select an initial character of the food name with the key, and consequently, it took longer period of time to select the intended food.

On the other hand, while it is desired to input the food name immediately after taking a meal in order not to forget it, the person would frequently hesitate to do it with the input means as above. The reason for which is that there may be any possibility of making dirty of the apparatus with his hands that may not be clean after the meal. If the person thinks to do it after washing his hands it may happen that he forgets some of the foods that he ingested and even the input operation itself.

In such manner the input operation for the names of foods ingested has been very cumbersome and taking longer period of time. Therefore, even if the calorie control is conducted with the use of the calorie control apparatus, it is likely be discontinued in the middle way due to such cumbersome input operation. Thus the prior art calorie control apparatus needs for the person to have great perseverance for continuing the calorie control.

Furthermore, in the case of the calorie control for an aged person suffering from slips of memory, he tends to forget some of the food names and the amount of food that he ingested, if the input operation takes longer period of time to enter the names of foods. As the result, no precise calorie control can be attained for such aged person.

SUMMARY OF THE INVENTION

In view of the above an object of the present invention is to provide a calorie control apparatus that can eliminate the above problems in the prior art.

To attain such object the present invention provides a calorie control apparatus for calculating and controlling the calorie intake by entering a name of food ingested, comprising: a voice input unit; a memory unit; a voice recognition unit; and a control unit, whereby said voice input unit enters a voice signal, said memory unit stores the calorie value per a unit amount of each of foods, said voice recognition unit identifies the name of food on the basis of the voice signal entered, and said control unit calculates the calorie intake on the basis of the calorie value per a unit amount of the food stored in the memory unit corresponding to the food name identified.

According to one embodiment of the present invention the calorie control apparatus further comprises a manual input unit and the manual input unit enters the name of food ingested by the way other than by the voice signal.

According to another embodiment of the present invention the manual input unit is of pen touch type.

According to further embodiment of the present invention the calorie control apparatus further comprises a pen storage portion and the pen storage portion receives a pen that is used for touching to the manual input unit.

According to further embodiment of the present invention in response to unsuccessful identification of the food name by the voice recognition unit switching to the manual input unit from the voice recognition unit is effected for inputting the food name.

According to yet further embodiment of the present invention in response to unsuccessful identification of the food name by the voice recognition unit continuing several times switching to the manual input unit from the voice recognition unit is effected for inputting the food name.

According to yet further embodiment of the present invention the calorie control apparatus further comprises a display unit, the memory unit stores information about the voice signal for each of the food names, said voice recognition unit has a function of comparing the voice signal entered with the information about the voice signal for each of the food names stored in the memory unit and of determining a degree of matching therebetween, and said display unit displays the food name that has higher degree of matching as determined by the voice recognition unit under the control of said control unit.

According to yet further embodiment of the present invention the display unit displays a plurality of the food names having higher degree of matching as determined by the voice recognition unit, among which the correct food name can be selected.

According to yet further embodiment of the present invention the memory unit stores a history of the foods ingested in the past, and a specific food name is selected from among those having higher degree of matching as determined by the voice recognition unit on the basis of the history of the foods ingested in the past stored in the memory unit for displaying it on the display unit.

According to yet further embodiment of the present invention the display unit displays total calories for all the foods ingested and each calorie for each of the foods ingested.

According to yet further embodiment of the present invention in response to unsuccessful identification of the food name by the voice recognition unit an error message on said display unit is changed depending upon the condition of the voice signal.

According to yet further embodiment of the present invention the calorie control apparatus further comprises a cover that acts to cover said display unit.

According to yet further embodiment of the present invention the cover is molded from a transparent material.

BRIEF DESCRIPTION OF THE DRAWINGS

Now the present invention will be described in more detail with reference to the accompanying drawings, in which:

FIG. 6 is a flow chart for explaining a graphic display mode in the calorie control apparatus in FIG. 1;

FIGS. 7(a), 7(b), 7(c), 7(d), 7(e) and 7(f) each shows an example of display screen of the calorie control apparatus in FIG. 1.

DESCRIPTION OF THE PREFERRED EMBODIMENTS

Figure 1:
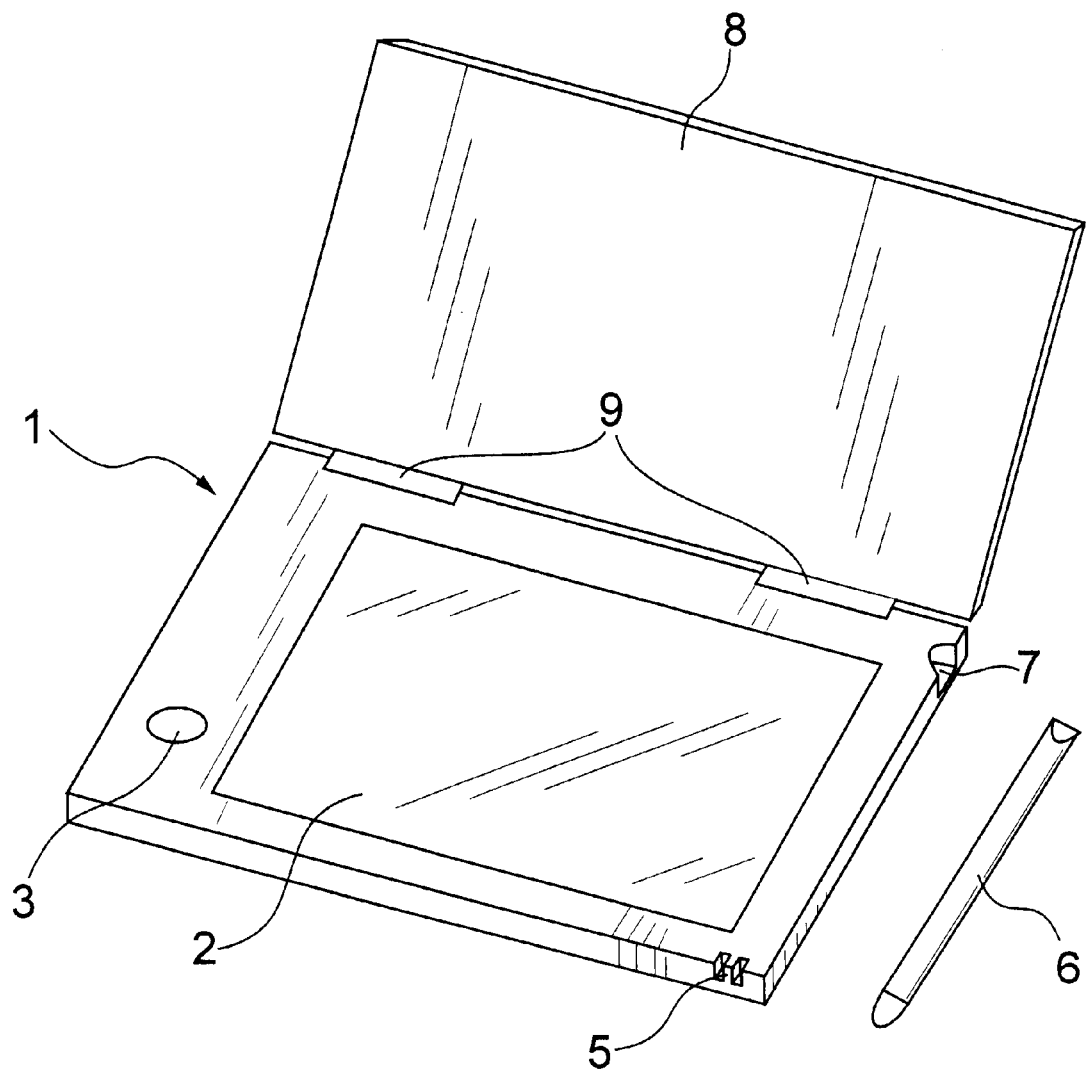
FIG. 1 is a schematic external view illustrating a calorie control apparatus according to one embodiment of the present invention.
Figure 2:
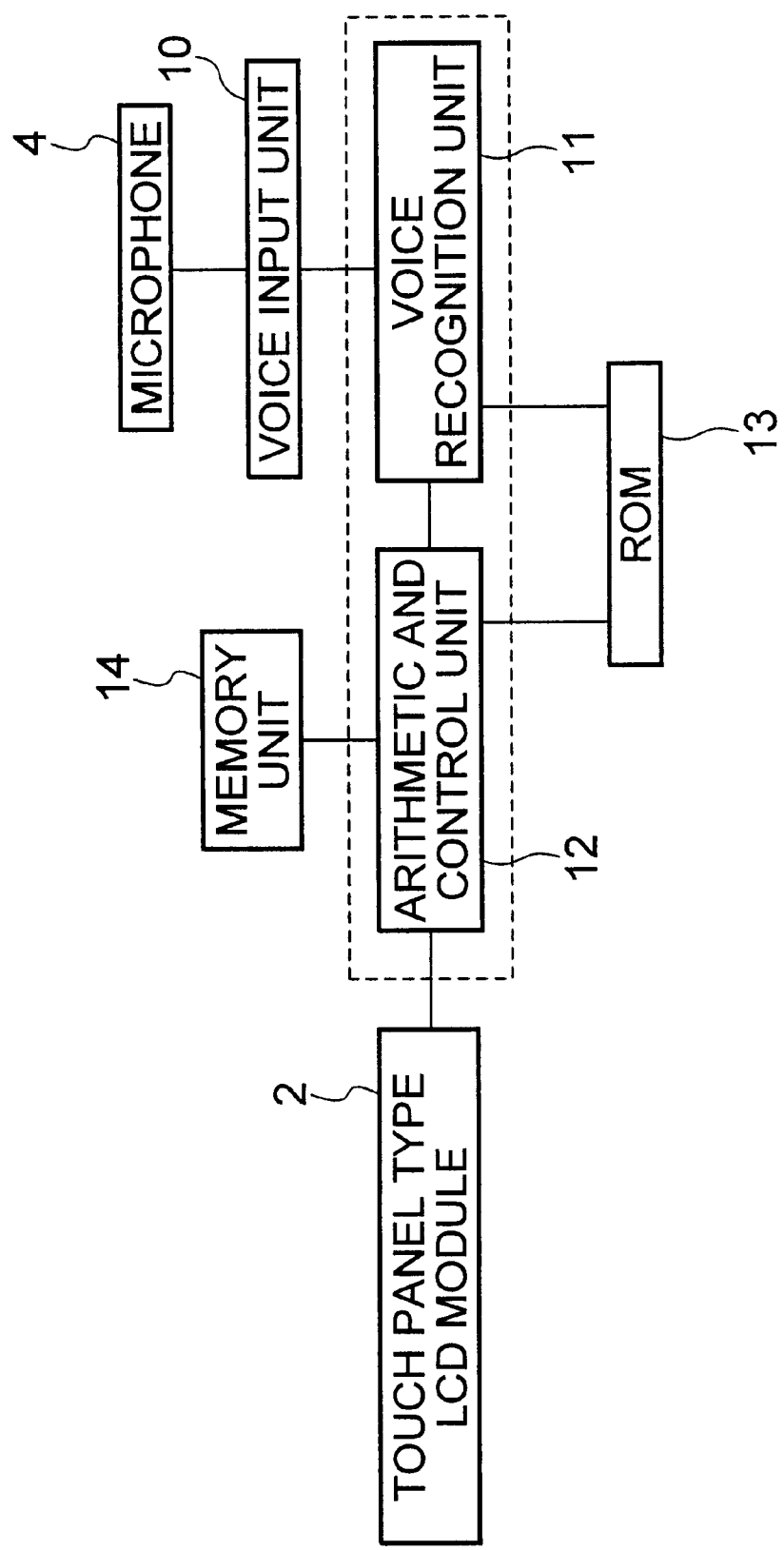
FIG. 2 is a block diagram showing a configuration of the calorie control apparatus in FIG. 1.

FIG. 1 is a schematic external view illustrating a voice recognition calorie control apparatus constructed in accordance with one embodiment of the present invention. FIG. 2 is a block diagram illustrating the voice recognition calorie control apparatus in FIG. 1. As best seen in FIG. 1 the calorie control apparatus 1 comprises a touch panel type LCD module 2 acting as both display and input means, and a power switch 3 for turning the apparatus ON and OFF. In addition a hole 5 is formed in the calorie control apparatus 1 for transmitting a voice to a microphone 4 (see FIG. 2) mounted therein. A touch pen 6 is also provided for entering the data by making contact to the touch panel type LCD module 2 after pulling out of the calorie control apparatus 1. The calorie control apparatus 1 further includes a storage portion 7 for containing the touch pen 6 when it is not used, and a cover 8 for protecting the touch panel type LCD 2. The cover 8 is mounted to the calorie control apparatus 1 via a hinged portion 9 thereof for freely opening and closing the apparatus. The cover 8 fully covers the calorie control apparatus 1 when it is at closed position.

As best seen in FIG. 2 the calorie control apparatus 1 includes the microphone 4 for receiving the voice signal and converting it into an electrical voice signal. A voice input unit 10 is included in the apparatus 1 for converting the electrical voice signal from the microphone 4 from an analogue form into a digital form. This digital voice signal is then fed to a voice recognition unit 11 for determining which of the food names substantially matches to the digital voice signal fed thereto. An arithmetic and control unit 12 consisting of a CPU or a microcomputer is included for conducting calorie calculation and for controlling other units in the apparatus 1. In addition a ROM 13 is provided for storing the different information such as the voice signals for the foods as well as the calories and nutritive substances for the foods. A memory unit 14 is provided for storing a history for the foods ingested for every day as well as a personal data entered as the initial setting. Finally the touch panel type LCD module 2 as described above is included in the apparatus 1 that has both an input function and a display function acting under the instructions from the CPU 12.

Now an operation of the calorie control apparatus 1 having the configuration as described above will be described in more detail with reference to flow charts in FIGS. 3 to 6 and to LCD screen views in FIGS. 7(a)–7(f) and 8(a)–8(b). It is noted in the present description that the term "key" means a key that is displayed on the touch panel type LCD module 2 and that is operated by making contact thereto with the touch pen 6.

Figure 3:
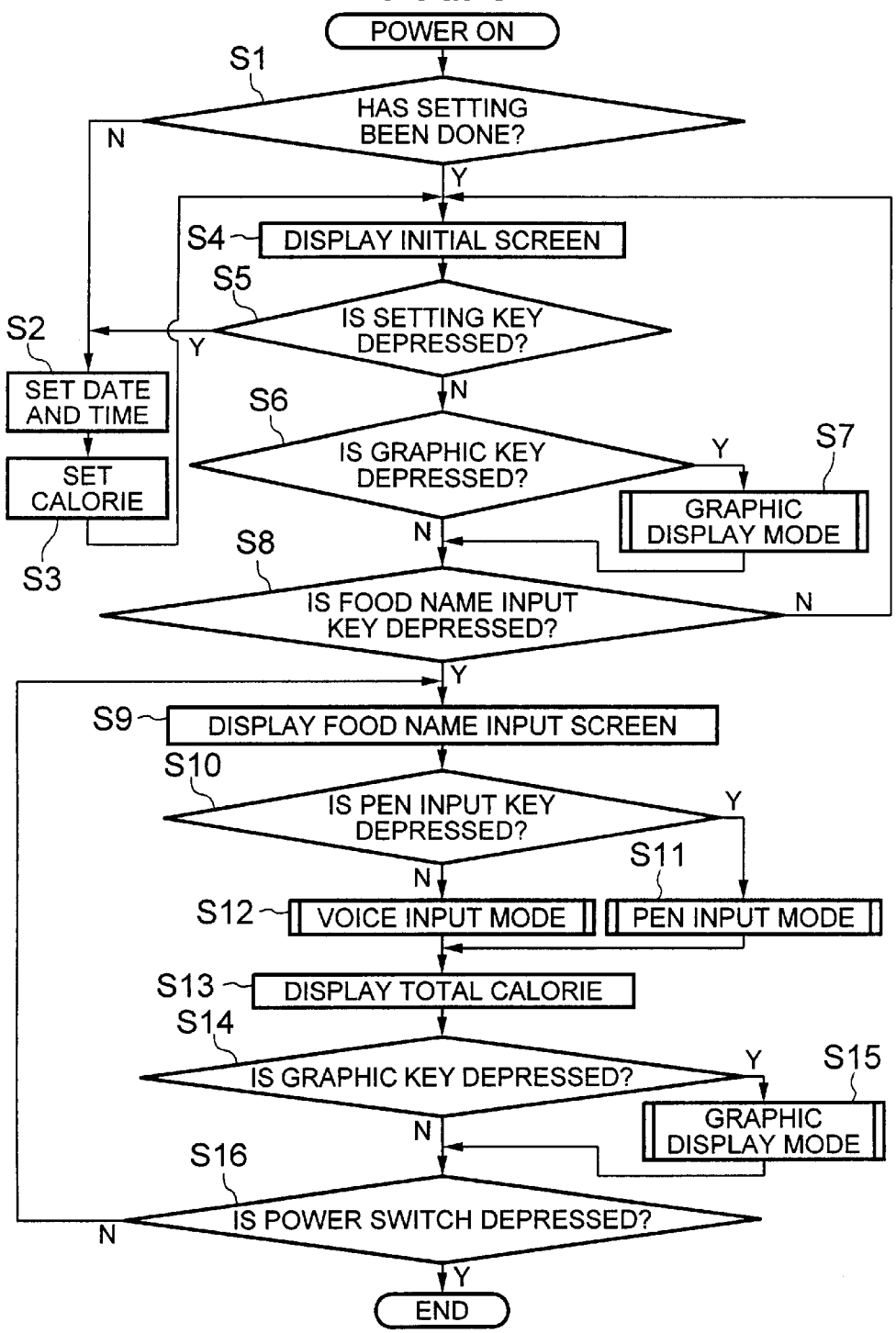
FIG. 3 is a main flow chart for explaining an operation of the calorie control apparatus in FIG. 1.

FIG. 3 is a main flow chart for the calorie control apparatus 1. Referring to FIG. 3 a person who desires to conduct the calorie control pushes the power switch 3 to activate the power source for the apparatus 1 so that it becomes operated. Then the CPU 12 determines whether the initial setting of the memory 14 has been done or not (step S1). If not, the procedure automatically enters the initial setting mode.

In the initial setting mode the setting of date and time is initially performed to set the current date and the current time (step S2). Then the target calorie intake is entered. In this connection, if a physician designates a certain calorie intake for a day, the designated value is entered for the target calorie intake. After the setting, a normal initial screen is displayed (step S3).

Figure 7A:
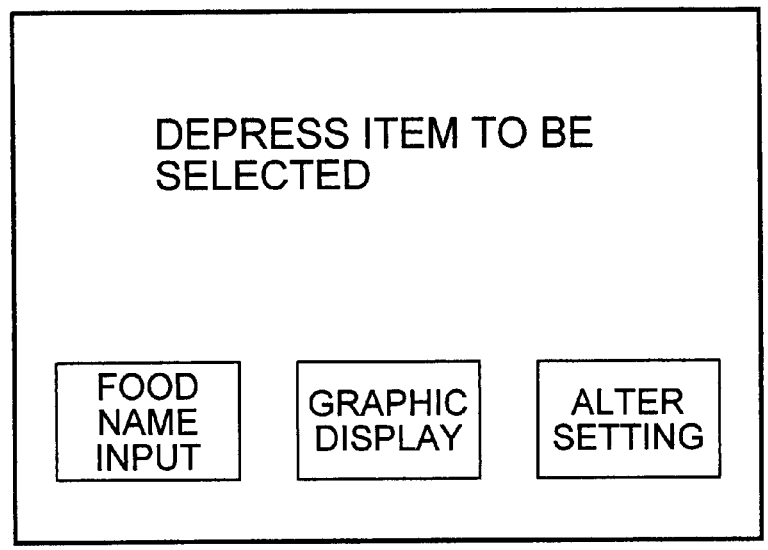

If the initial setting has been done in step S1 or after completion of the initial setting in steps S2 and S3 the normal initial screen as shown in FIG. 7(a) is displayed on the LCD module 2 (step S4).

While displaying the initial screen a check is made to see whether the setting key is depressed or not, in other words, whether the data already set is going to be changed or not (step S5). If so, the procedure proceeds to step S2 for the setting mode, but if not, it proceeds to the next step (step S6).

In this step S6 a check is made to determine whether a graphic display key on the initial screen in FIG. 7(a) is depressed or not. If so, the procedure proceeds to step S7 to enter a graphic display mode, as described below. But, if not, a check is made to determine whether a food input key is depressed or not (step S8). If so, the procedure enters a food name input mode. But, if not, the procedure returns to step S4 to continue the display of initial screen as shown in FIG. 7(a).

Figure 7B:
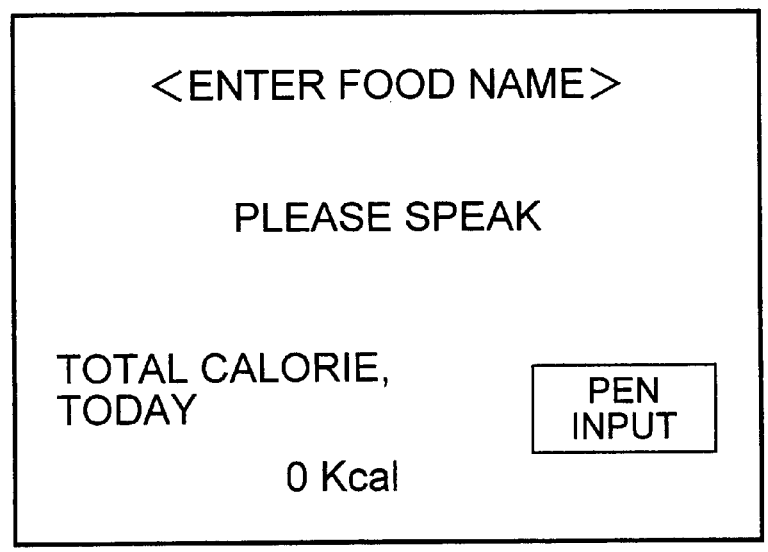
Figure 7C:
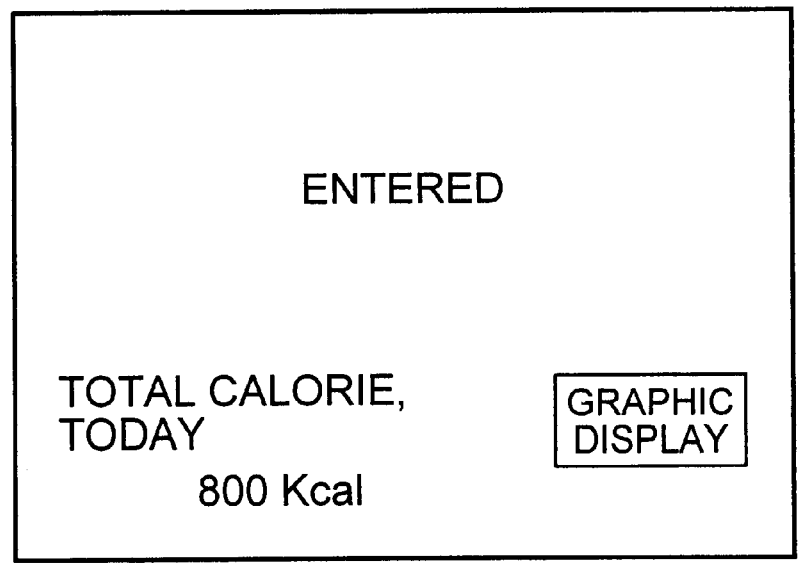

In the food name input mode, a message indicating that a voice input is possible is initially displayed, as shown in FIG. 7(b) (step S9). Then a check is made to see whether a pen input key is depressed or not, in other words, whether a change to a pen touch input is going on or not (step S10). If so, the procedure enters a pen touch input mode (step S11), as described below, but if not, it enters a voice input mode (step S12).

After completion of the food name input operation, a message indicating that the input operation has been done is displayed, together with the total calorie value for that day (step S13). Then a check is made to see whether the graphic display key is depressed or not (step S14). If so, the procedure enters the graphic display mode. Finally a check is made to see whether the power switch 3 is depressed or not. If so, the power supply for the apparatus is turned OFF to terminate all the operations. But, if not, the procedure returns to step S9 for entering the food name again.

Now the voice input mode of operation will be described in more detail. In the voice input mode the voice recognition process is used to select the name of food ingested from among a group of food names stored in the ROM 13. Any suitable voice recognition technique already known in the art can be used in the present invention. Such technique has been used in various fields such as telephones, personal computers, car navigation systems and the like. Therefore, no detailed description for the voice recognition technique itself will be made, but the general description therefor enough to understand the present invention will be made hereunder.

The voice recognition is, for instance, effected in the following manner. At first, a voice input is picked up by the microphone for converting into an electrical signal. In this connection, it is preferred that a close-talking microphone or a compact directional microphone is used for the microphone in order not to pick up the surrounding noise. It is not necessary to strictly define the type of microphone, here, because of the possibility of removing any noise by the software processing in the CPU 12. The voice signal input through the microphone is then fed to a frequency analyzer by which it is divided into a plurality of frames each having duration of a few milliseconds to a few tens milliseconds. A spectrum is calculated for each of the frames. A Fast Fourier Transformation is used for the spectrum analysis. The spectrum thus derived is then converted into a parameter based on the auditory sensation area, and the noise removal process is also applied thereto. Then a time change pattern of the spectrum is compared to a voice element model expressing a time series of a voice parameter in a voice element recognition unit. The result of voice element recognition is then compared to a word model in a word recognition unit to calculate a degree of matching therebetween. The result of the word recognition is used to select a combination of words that matches to a language model.

Figure 4:
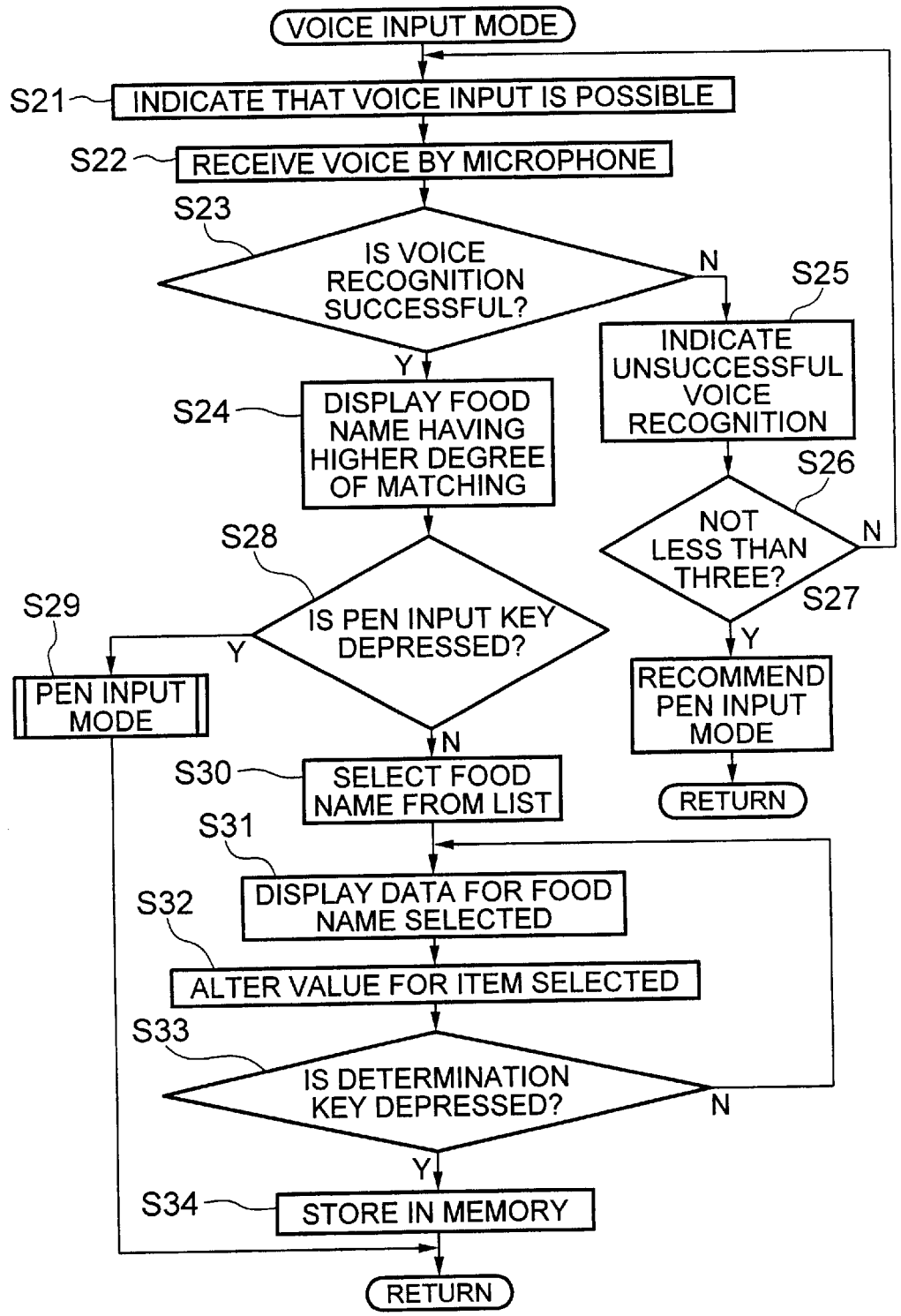
FIG. 4 is a flow chart for explaining a voice input mode in the calorie control apparatus in FIG. 1.

Now the voice input mode of operation will be described in more detail with reference to the flow chart in FIG. 4. In the voice input mode the display screen as shown in FIG. 7(b) is displayed on the LCD 2 (step S21). A person who desires to control the calorie intake speaks the name of food that he ingested toward the microphone 4 mounted in the hole 5. In this example it is assumed that the person speaks "curry".

Figure 7D:
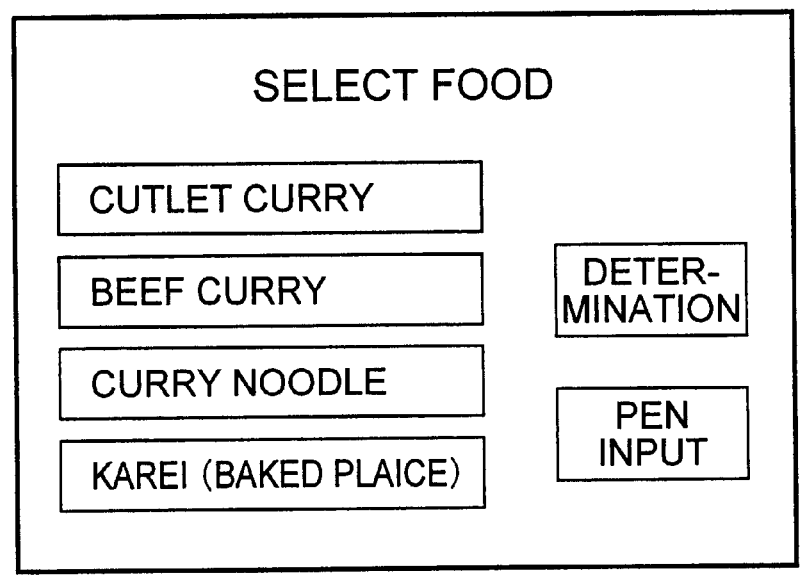

The voice signal input through the microphone 4 is fed to the voice input unit 10 by which it is converted from an analogue form into a digital form. The digital voice signal is then fed to the voice recognition unit 11 for determining which of the voice signals indicating the food names stored in the ROM 13 substantially matches to the digital voice signal (step S24). If the voice recognition is successful, a series of food names are sequentially displayed on the LCD 2, beginning with that having the highest degree of matching to the voice signal "curry", as shown in FIG. 7(d) (step S24). While watching the LCD 2, the person can select the food name that he spoke with the touch pen 6 if it is displayed on the LCD 2.

On the other hand, if the person can find no food name that he spoke on the LCD 2, it is determined in step S23 that the voice recognition is unsuccessful, and such fact is displayed on the LCD 2 (step S25). Then a check is made to confirm the number of times the voice recognition is unsuccessful (step S26). If the number of times is less than three, the procedure returns to step S21 for prompting the person to conduct the voice input again. But, if the number of times is not less than three, it is determined that there is no possibility of getting the successful voice recognition even if the voice input of the food name is further continued. Then a message for recommending the person to switch to manual pen touch input mode is displayed on the LCD 2 (step S27), and the voice input mode is terminated.

Alternatively, switching to the manual pen touch input mode may be done during sequential display of the food names in step S24 if they include no intended food name. Therefore a check is made to see whether the pen input key is depressed or not (step S28). If so, the procedure enters the pen touch input mode (step S29).

If the sequential display of the food names as shown in FIG. 7(d) includes the intended food name that the person desires to input then the person selects that food name and depresses a "determination" key (step S30). The selection of the food name and the operation of the determination key can be done with the touch pen 6, but they may optionally be done with the voice signal. After the selection of the food name in such manner the weight and calorie for that food for one person (100%) is displayed, as shown in FIG. 7(e) (step S31). While the calorie for one particular food is displayed, as shown, it is possible to alter the amount of intake displayed. More particularly, at first, the food for one person is defined as 100% and the weight and calorie therefor are displayed on the screen. However, in view of the fact that the amount of intake usually varies for every meal, the percentage, weight and calorie values can be altered accordingly by use of a ten-key on the LCD 2. If the calorie for the food ingested is known the calorie value displayed can directly be replaced therewith. The alteration of the value can be carried out in such manner that the person selects the item that he desires to alter, and then, enters the new value with the ten-key. If a value is altered other items associated therewith are automatically altered (step S32).

Then a check is made to see whether the determination key is depressed or not (step S33). If not, the procedure returns to step S31. But, if so, the food is registered as ingested. More particularly the food name, the date and the amount of food ingested are stored in the memory unit 14 (step S34). Then the voice input mode is terminated.

Figure 5:
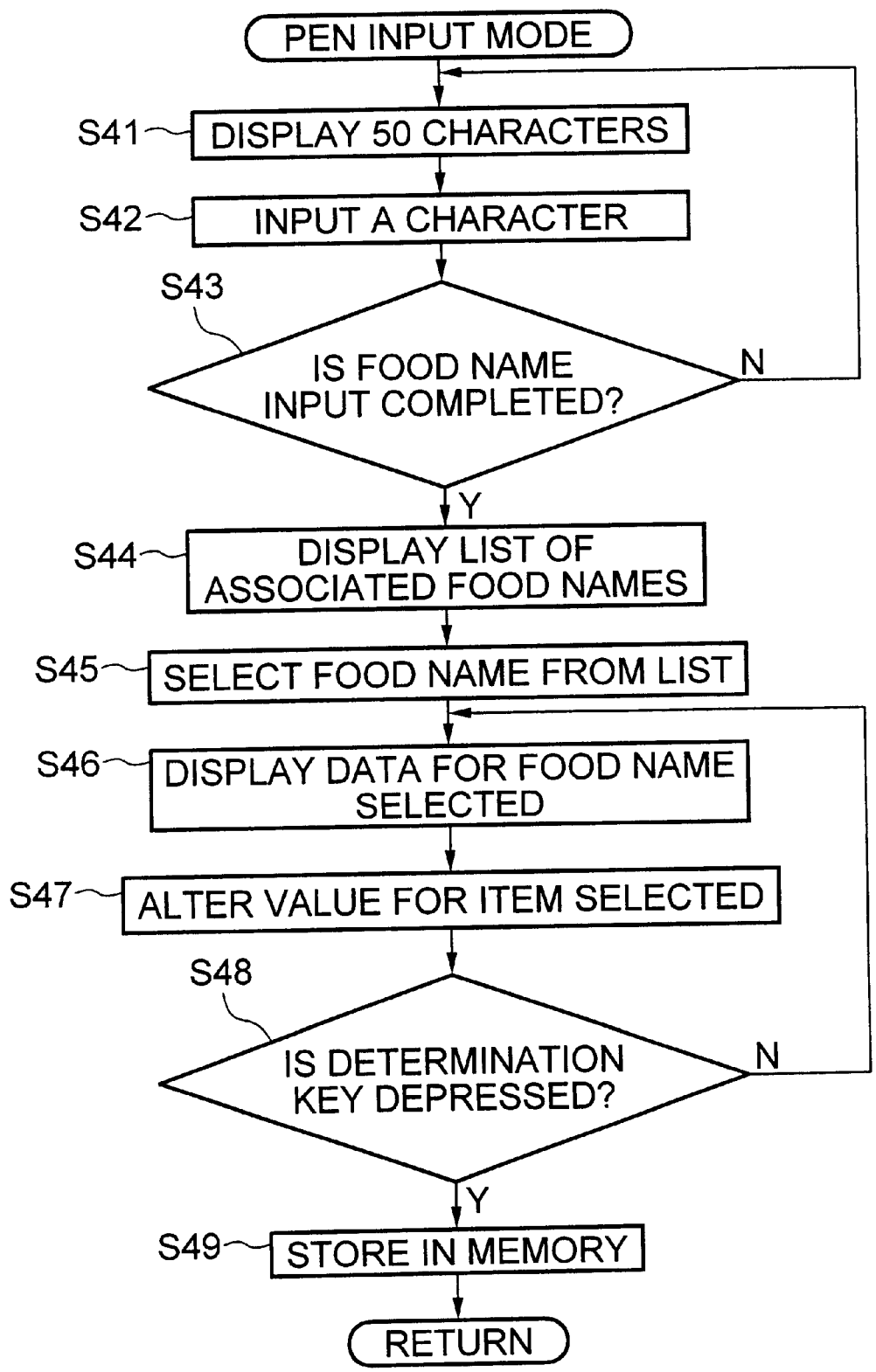
FIG. 5 is a flow chart for explaining a pen touch input mode in the calorie control apparatus in FIG. 1.

Now the pen touch input mode of operation will be described in detail with reference to the flow chart in FIG. 5. In the pen touch input mode, the Japanese syllabary (Japanese characters), "あ" to "ん" are displayed on the screen, as shown in FIG. 7(f) (step S41). In such condition the person enters the food name one character by one character with the touch pen 6 (step S42). Each time one character is entered a check is made to see whether the determination key is depressed or not, in other words, whether the food name has been entered or not (step S43). The Japanese syllabary(Japanese character) continue to be displayed until the input operation is terminated. When depressing the determination key the list of the food names associated with the food name entered is displayed (step S44). In this example, assuming that "curry" is entered as the food name with the touch pen, the list of the food names as shown in FIG. 7(d) is displayed.

While displaying the list of the food names, the person selects the food name that he desires to input if it is included in the list, and depress the determination key (step S45). After selection of the food name the weight and calorie for that food for one person (100%) is displayed, as shown in FIG. 7(e) (step S46). Although the calorie for one particular food is displayed, as shown, it is possible to alter the amount of intake displayed. More particularly, at first, the food for one person is defined as 100% and the weight and calorie therefor are displayed on the screen. However, in view of the fact that the amount of intake usually varies for every meal, the percentage, weight and calorie values can be altered accordingly by use of the ten-key on the LCD 2. If the calorie for the food ingested is known the calorie value displayed can directly be replaced therewith. The alteration of the value can be carried out in such manner that the person selects the item that he desires to alter, and then, enters the new value with the ten-key. If a value is altered other items associated therewith are automatically altered (step S47).

Then a check is made to see whether the determination key is depressed or not (step S48). If not, the procedure returns to step S46. But, if so, the food is registered as ingested. More particularly the food name, the date and the amount of food ingested are stored in the memory unit 14 (step S49). Then the pen touch input mode is terminated.

Figure 8:
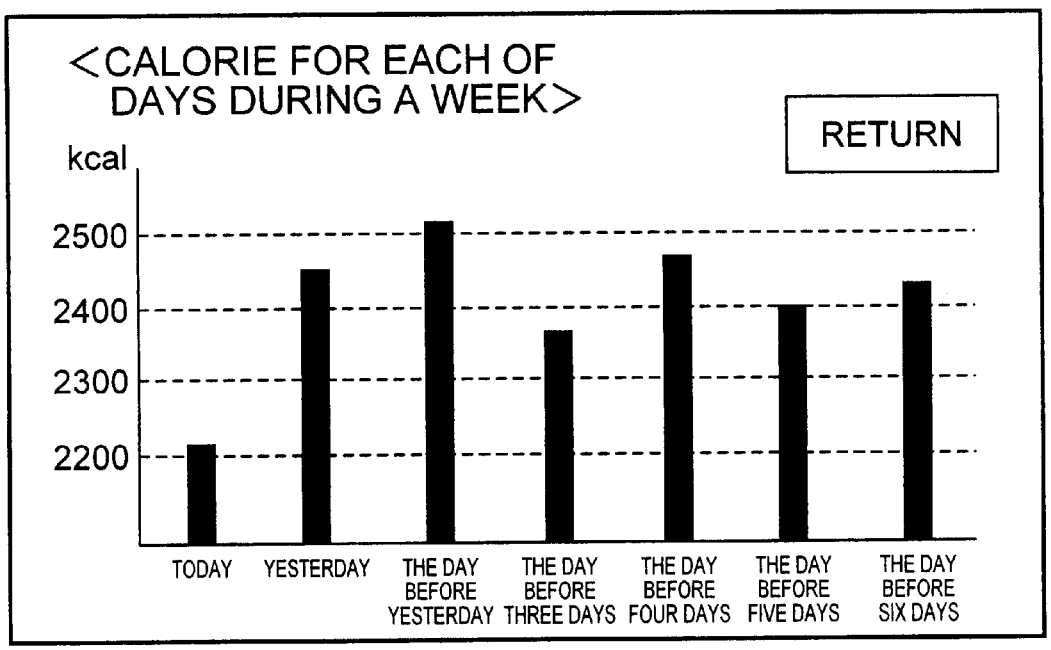
FIGS. 8(a) and 8(b) each shows an example of display screen of the calorie control apparatus in FIG. 1.
Figure 8:
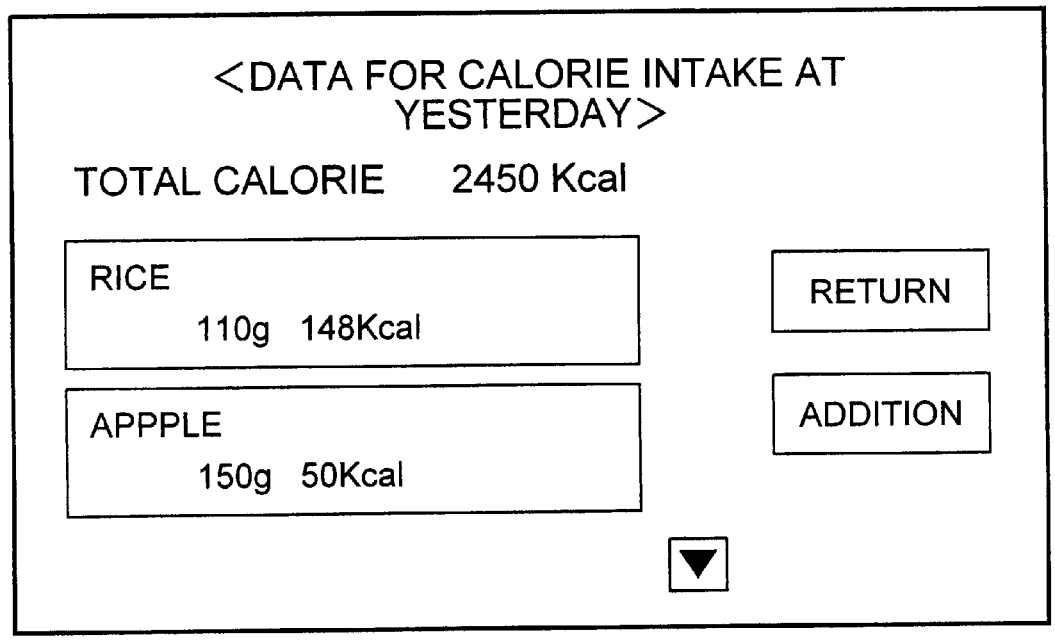

Now the graphic display mode of operation will be described in detail with reference to the flow chart in FIG. 6. In the graphic display mode the calorie intake for each of the days during a week is graphically displayed on the screen, as shown in FIG. 8(a) (step S51). In such condition a check is made to see whether any bar on any particular day in the bar graph is touched with the touch pen or not (step S52). If the bar on the day of "yesterday" is touched or selected with the touch pen then the data for the foods ingested in that day is displayed (step S53). When depressing an "arrow" mark the data for the foods displayed is scrolled so that all the data for the food ingested can be seen. If the person remembers that he did not enter the data for some food that he ingested in that day then he can additionally enter such data. Accordingly a check is made to see whether an "addition" key is depressed or not (step S54). If so, the procedure enters the food name input mode. In this connection a check is made to see whether the pen input key is depressed or not (step S55). If so, the procedure enters the pen input mode (step S56). But, if not, it enters the voice input mode (step S57).

After completion of entering the data for the food in either input mode the procedure returns to step S53 for displaying the food data for the particular day, as shown in FIG. 8(b).

If the answer of step S54 is "NO" and the answer of step S58 is "YES" then the procedure returns to step S51 for displaying the bar graph showing the calorie intake for each of the days during a week, as shown in FIG. 8(a).

While displaying the bar graph, as shown in FIG. 8(a), depressing a "return" key (step S59) terminates the graphic display mode.

Alternatively the calorie control apparatus may be configured in such manner that the list of the food names is displayed on the basis of the result of the voice recognition unit 11 and the history of foods ingested in the past as stored in the memory unit 14. In such case, a minor change in operation is required especially at step S24 in the voice input mode. In particular the food names having higher degree of matching are sequentially displayed, as described earlier, but they are re-displayed in the different order based upon how many times were the foods ingested previously, as stored in the memory unit 14. That is to say, the name of food having highest number of times it was ingested in the past is displayed on the top position of the screen.

In addition the calorie control apparatus may include a voice output unit for providing a guide function. More particularly a voice signal produced by an acoustic synthesizer is output through the voice output unit, for example, a speaker for prompting the person to perform an operation. For instance, a voice message "Please speak" may be produced in step S21, "Your voice failed to be recognized" may be produced in step S25, and "Please select the food" may be produced in step S24. Furthermore the voice signal, as it is recognized, may directly be output in step S23.

According to such configuration it becomes very easy to operate the apparatus because of the possibility of inputting the food name in interactive manner.

Thus far described is the one embodiment of the calorie control apparatus according to the present invention in which the food name is entered by using both the voice input operation and the pen touch input operation. In another embodiment the voice input operation may be used alone. In view of the convenience for a user, however, it is preferable to use the pen touch input operation as well.

In the embodiment as described above, the direct input of the food name by the pen touch input has been described, as used for the manual input means when the voice recognition is impossible. In addition thereto, the present invention may include other input means already known in the art, such as a character recognition method in which a character written on a touch panel with a pen is recognized; an input method in which a cross-key is used for selecting a food name in a food name list; and an input method as disclosed in Japanese Patent Application Laid-Open No. 11-211549.

The cover of the calorie control apparatus may be molded from a transparent material. In such case if the calorie control apparatus is kept ON with the transparent cover closed when a user takes a meal then the user can confirm the previous calorie control data while taking a meal. At this time because of the touch panel type LCD module covered with the transparent cover there is no possibility of making dirty of the calorie control apparatus even in taking a meal.

As described earlier the calorie control apparatus has the hole formed on the side surface for transmitting the voice signal to the microphone mounted therein. Such hole, together with the transparent cover, makes possible for the user to input the voice signal for food data while seeing the display screen covered with the transparent cover. If desired the user may open the cover to input the data with the pen. In this case, again, because of the touch panel type LCD module covered with the transparent cover there is no possibility of making dirty of the calorie control apparatus. Furthermore because the apparatus is enclosed by the cover during the time it not used or it is carried by the user the touch panel type LCD module is protected by the cover so that there is no possibility of any erroneous operation occurred.

In the embodiment as described above, the microcomputer has been described, as used for the voice recognition process unit. However, the present invention is not limited to such unit, but it also covers the use of DSP (Digital Signal Processing). The DSP is such processor that is designed for the purpose of fast processing the digital signal. Unlike the microcomputer (or microprocessor), the DPS includes a hardware multiplier capable of executing a fast multiplication and addition operation, and has an addressing mode suitable for filtering and FFT (data delay function). Therefore the DSP makes possible the concurrent operations of multiplication and addition; addressing; and operation of data for multiplication and addition in a shorter machine cycle.

In the embodiment as described above the calorie control has been configured in such manner that the total calorie for each of the foods is controlled. However, the present invention is not limited to such configuration, but it may be embodied in another form wherein the calorie control is conducted for each of the food groups. Correspondingly the calorie intake for each of the food groups may be graphically displayed.

In the embodiment as described above an error message "Your voice failed to be recognized" has been produced when the voice recognition is impossible. However, the present invention is not limited to such message, but many other messages may be produced depending on the circumstances. For instance, a message "Please speak more loudly" may be produced when the voice signal is small in amplitude. On the contrary, "Please speak more quietly" may be produced when the voice signal is larger. In addition, "Please speak more slowly" may be produced when the spectrum of the voice signal is small. Further, "Please speak in more quiet place" may be produced when the noise other than the true voice is present. Accordingly it becomes possible for a user to more easily and reliably input his voice signal.

It is apparent from the foregoing that the calorie control apparatus with voice recognition according to the present invention obviates the need of direct contact with user's hands because of the voice input capability. This is effective in that there is no possibility of making dirty of the apparatus with user's hands that may not be clean after the user took a meal. In addition, because of the voice input achievable immediately after taking a meal, even an aged person suffering from slips of memory can reduce any defective matters such as forgetting of the input operation itself and misunderstanding of the amount of intake.

The calorie control apparatus with voice recognition according to the present invention is configured in such manner that as soon as a user speaks a food name the relevant food names are selected from among those stored in the memory unit. Such configuration can solve the problems in the prior art. In particular it can significantly reduce the time and labor required for inputting the name of the food ingested by searching for it from among the great number of food names in the list. Therefore it makes possible to continue the calorie control by using the calorie control apparatus of the present invention, that was likely to be discontinued with the prior art apparatus.

As described earlier, according to the present invention, the particular food name may selected from among the food names stored in the memory unit on the basis of the result of the voice recognition unit and the history of the foods ingested previously as stored in the memory unit. In such case the food that was ingested more frequently is displayed at upper position in the list, even a plurality of food names having the same degree of matching present. Such configuration is very convenience for a user to easily operate the apparatus.

In general the voice recognition technique has not yet reached such reliable level that it can identify the input voice signal in the same manner as the typical contact type switch. However, by configuring the apparatus to have both the voice input and the manual input, either one of them may be used depending upon the circumstances where the apparatus is used. For instance, when it is difficult to use the voice input due to the noisy and crowded circumstances and when the user is present in the public area where he must keep quiet then the manual input may usefully be used.

In case of the manual pen touch input, the voice input or the touch pen may be used to enter the name of food ingested. Therefore there is no need for a user to touch the control apparatus with his hand, which makes no possibility of making dirty of the apparatus.

What is claimed is:

1. A calorie control apparatus for calculating and controlling a calorie intake by entering a name of food ingested, comprising:
    a voice input unit;
    a memory unit;
    a voice recognition unit;
    a display unit; and
    a control unit, wherein said voice input unit is for entering a voice signal; said memory unit stores the calorie values per a unit amount of each of a plurality of foods and information about a voice signal for each of the food names; said voice recognition unit compares the voice signal entered with the information about the voice signal for each of the food names stored in the memory unit and determines a degree of matching therebetween; said display unit displays a plurality of the food names having a higher degree of matching as determined by the voice recognition unit, from among which the correct food name can be selected; and said control unit calculates the calorie intake on the basis of the calorie value per a unit amount of the food stored in the memory unit corresponding to the food name selected.

2. A calorie control apparatus for calculating and controlling the calorie intake by entering a name of food ingested, comprising:
    a memory unit;
    a voice recognition unit;
    a display unit; and
    a control unit, wherein said voice input unit is for entering a voice signal; said memory unit stores the calorie value per unit amount of each of a plurality of foods, information about a voice signal for each of the food names and a history of the foods ingested in the past; said voice recognition unit compares the voice signal entered with the information about the voice signal for each of the food names stored in the memory unit and determines a degree of matching therebetween; said display unit displays specific food names selected from among those having a higher degree of matching as determined by the voice recognition unit on the basis of the history of the foods ingested in the past stored in the memory unit, from among which the correct food name can be selected; and said control unit calculates the calorie intake on the basis of the calorie value per a unit amount of the food stored in the memory unit corresponding to the food name selected.

* * * * *